Aug. 18, 1942.  P. J. POKLUDA  2,293,170
MOWER ATTACHMENT FOR TRACTORS
Filed Aug. 26, 1940  3 Sheets-Sheet 1

Inventor
Paul J. Pokluda
By Clarence A. O'Brien
Attorney.

Inventor
Paul J. Pokluda
By Clarence A. O'Brien
Attorney

Patented Aug. 18, 1942

2,293,170

UNITED STATES PATENT OFFICE 2,293,170

MOWER ATTACHMENT FOR TRACTORS

Paul J. Pokluda, Shiner, Tex.

Application August 26, 1940, Serial No. 354,279

1 Claim. (Cl. 56—25)

My invention relates to improvements in tractors and more particularly to mower attachments therefor.

The principal object of the invention is to provide the standard type farm tractor, of commerce, with a mowing equipment in front of the rear wheels of the tractor and for adjustment of the cutter bar or blade either by power, or hand, into ineffective and effective positions and into different cutting positions to vary the depth of the cut, as desired.

Other and subordinate objects are to provide an attachment which is inexpensive to manufacture and install and which may be embodied in the tractor without alteration in the basic structure of the latter.

To the accomplishment of the above, and the subordinate objects presently appearing, a preferred embodiment of my invention has been illustrated in the accompanying drawings, set forth in detail in the succeeding description, and defined in the claim appended hereto.

In said drawings:

Figure 5 is a view in perspective of part of one of the cutter bar operating levers, Figure 6 is a similar view of the frame-supporting hanger bracket, and Figure 7 is a fragmentary view in top plan of part of the frame and the draw-bar of the tractor.

Figure 1:
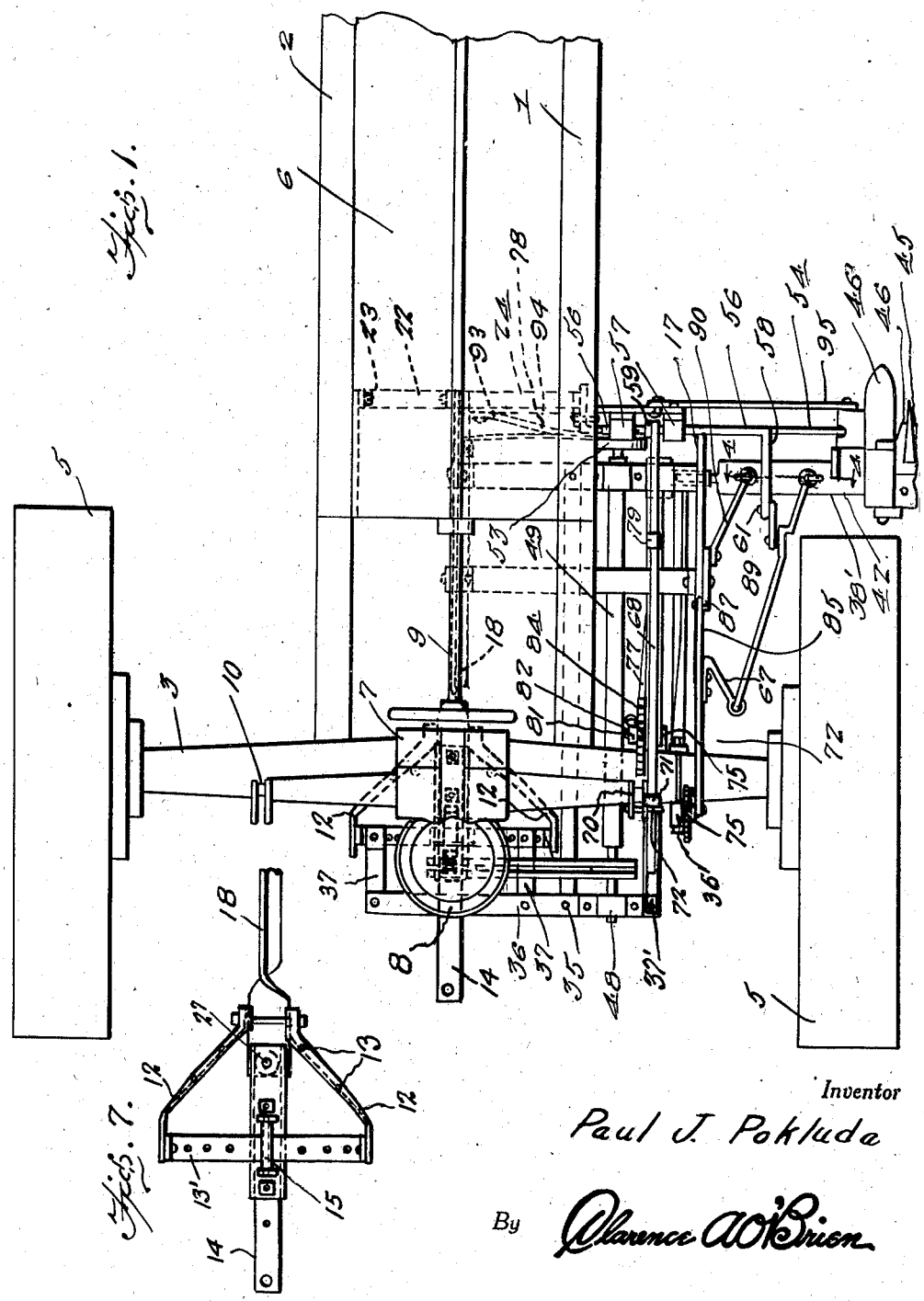
Figure 1 is a view in top plan of a tractor equipped according to my invention.

Referring to the drawings by numerals, I have shown my invention therein as applied to a conventionally illustrated farm tractor of well-known type, 1, and 2 designating the right and left-hand side bars of the chassis supported by the rear axle housing 3 of axle 4 supported by the ground wheels 5. The numeral 6 designates the power plant, generally, 7 the usual differential casing, 8 the seat, 9 the steering mechanism and 10 the power lift shaft above the axle housing 3, the numeral 11 designating a power take-off shaft extending rearwardly from the differential. The power lift and takeoff shafts 10, 11 are both of the conventional type, the power lift shaft 10 being driven under the usual manual control and by gearing from the differential. These parts being well known in the art it has not been deemed essential to illustrate the details thereof. The type of tractor illustrated also includes a pair of rearwardly divergent bars 12 under the differential casing 7 bolted thereto through bolt holes 13 and connected by an apertured cross bar 13' supporting a draw bar 14 suspended thereon, as at 15, for lateral adjustment thereon, said draw bar being disposed in the center of the tractor as will be understood.

According to my invention a frame 16 is provided beneath the chassis of the tractor to extend forwardly and rearwardly of the housing 3 and forwardly of the wheels 5 and to carry the cutter bar, drive mechanism therefor, and other parts all as presently described.

The frame 16 comprises a pair of upper right and left-hand side bars 17, 18, the former extending parallel with the right-hand chassis side bar 1 in outwardly offset relation thereto, and the latter extending beneath the chassis in the longitudinal center thereof. Said frame side bar 17 has an inwardly and forwardly extending right-angled front end 19, bolted, as at 20, to a depending plate 21 on the chassis side bar 1. The left-hand side frame bar 18 is suspended at its front from the left-hand chassis frame bar 2 by a bar 22 bolted, as at 23, to a plate 23' on said bar 2 similar to plate 21. Cross-bar 24 connects said front ends of said frame side bars 17, 18. The rear end of the right-hand side frame bar 17 is suspended from the axle housing 3 by an angle bar 25 suitably secured to said housing. The rear end of said frame bar 18 has the front end of the draw bar 14 pivoted thereto as at 27. A rear cross-bar 28' also extends between said bars 17, 18, intermediate their ends. A front cross-bar 28 extends between said bars 17, 18. The frame 16 further includes a pair of lower right and left-hand side bars 29, 30, suspended from said side bars 17, 18 at their front ends by a drop bracket 31 having its side legs 32 bolted to said bars 17, 18, as at 33. A brace bar 34 extends between the legs 32 of bracket 31 above the bottom of the latter. A brace bar 32' extends between the bracket 31 and the angle bar 25. The rear ends of said lower side bars 29, 30 extend below the axle housing 3 and rearwardly thereof and are bolted, as at 35, to a cross-bar 36 extending beneath the rear end of the draw-bar 14 and suspended by a right-angled hanger bracket 37 bolted to the beforementioned cross-bar 13. A suspension bar 35' bolted to the rear side of a clip 36' on housing 3 and to the other end of bar 36, as at 37', supports said other end of said bar 36.

The described frame 16 carries, at its front end, a support 38 for the cutter assembly, presently described, which support comprises a yoke 39, pivoted, as at 40, in a corner bearing 41 provided on the right side of the bracket 31 at the bottom thereof, said yoke being vertically swingable about a horizontal axis and transverse to the line of travel of the tractor. An arm 42 extends from said yoke 39 axially thereof with one end 43 rotatably mounted in said yoke and retained therein by a set collar 44, the arrangement being such that said arm is rotatable about an axis transverse to the axis of movement of yoke 39.

The usual mowing machine cutter bar 45, cutter bar guard 46, and ground shoe 46' are suitably mounted on the arm 42 as between ears one of which is shown at 47 on said arm.

Driving mechanism for the cutter bar 45 is provided as follows. Journaled at its opposite ends in bearings 48 on the beforementioned bracket 31 and bar 36 to extend lengthwise of said frame 16 between the lower side bars 29 and 30 is a driven shaft 49 having a pulley 50 fast on its rear end to which the power take-off shaft 11 is operatively connected by a pulley 51 fast thereon and a belt 52 extending between said pulleys. The described belt and pulley connection is preferably of the duplex type. Fast on the front end of driven shaft 49 is a pitman disk 53 operatively connected by a pitman rod 54 to the inner end of cutter bar 45 in the usual manner.

As will be understood, vertical swinging of the support 38 provides for lowering and raising the cutter bar 45 into and from cutting position and rotation of the arm 42 provides for tilting of the cutter bar 45 in the lowered position thereof to vary the height of the cut from the ground.

Power operative means for swinging said support 38 is provided as follows. A transverse rock shaft 56 is journaled in bearings 57 upstanding from the end 19 of side bar 17, said shaft extending transversely of the frame 16 and having a rearwardly extending end crank arm 58 and an intermediate upstanding crank arm 59 thereon. A rod 60 is swivelled at its upper end, as at 61, to crank arm 58 with its lower end similarly connected, as at 62, to a cutter bar swinging link 63. Link 63 extends rearwardly from the support 38 and has its front end swivelled, as at 64, on an eye-bolt 65 on the arm 42 of said support, the rear end of said link being swivelled, as at 66, to an arm 67 depending from the side bar 17 of the frame 16. As will be clear, rocking of the shaft 56 in one direction, i. e. clockwise as viewed in Figures 1 and 2, will exert a pull on rod 60, such pull swinging link 63 upwardly on arm 67 to lift the support 38 and raise the cutter 45 from cutting position. For rocking shaft 56 in said direction a push rod 68 is pivoted at one end to crank arm 59, as at 69. A one-way connection is provided between the other end of push rod 68 and a crank 70 on the power lift shaft 10, said connection comprising a set collar 71 on said rod and a collar 72 slidable on the rod and pivoted on said crank. As will be clear, operation of said crank 70 in the proper direction will move the rod 68, forwardly, as viewed in Figure 2, to operate the rock shaft 56 and effect swinging of the support 38 in a direction to raise the cutter bar 45. Conversely, reverse operation of said crank 70 will permit the cutter bar 45 to swing downwardly into cutting position under the influence of gravity.

Figure 2:
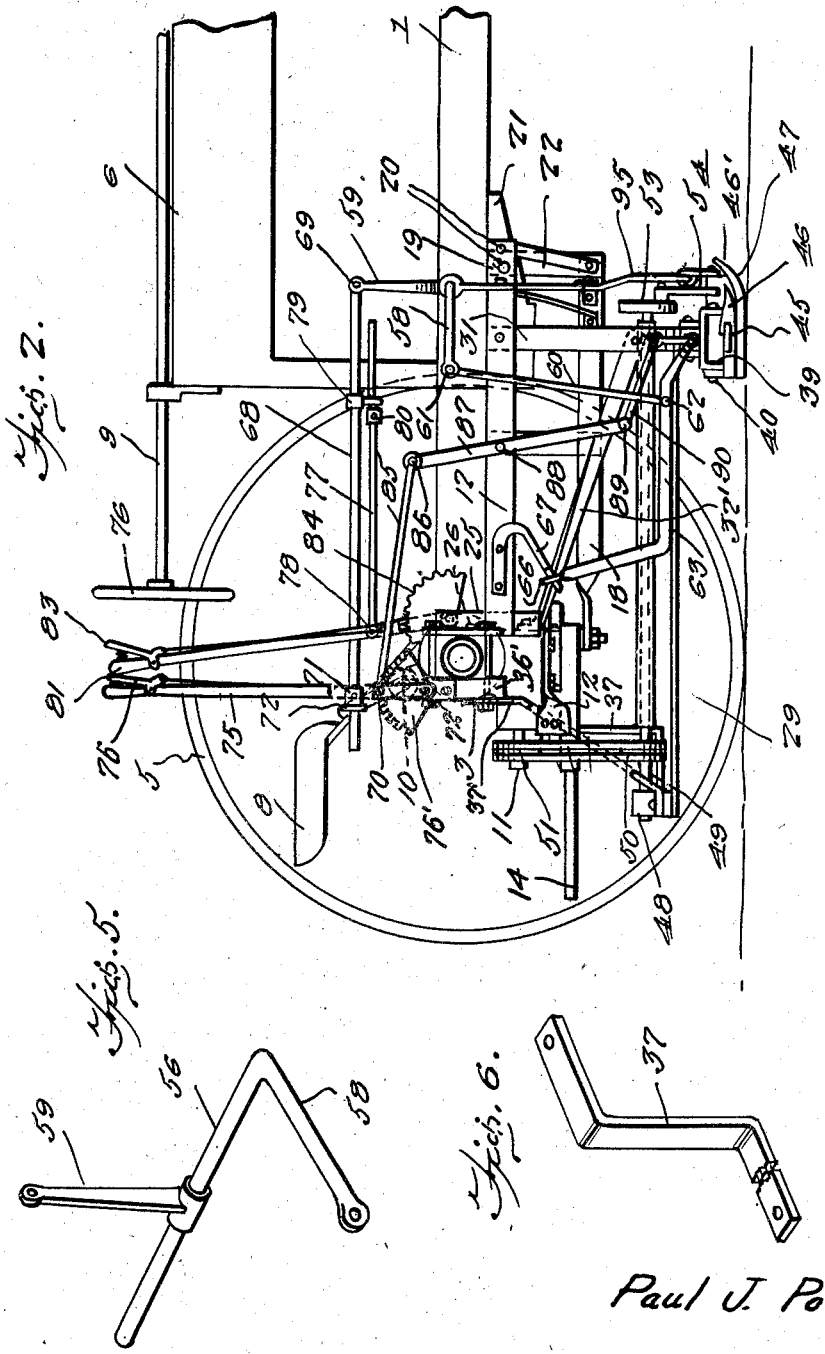
Figure 2 is a view in side elevation.
Figure 3:
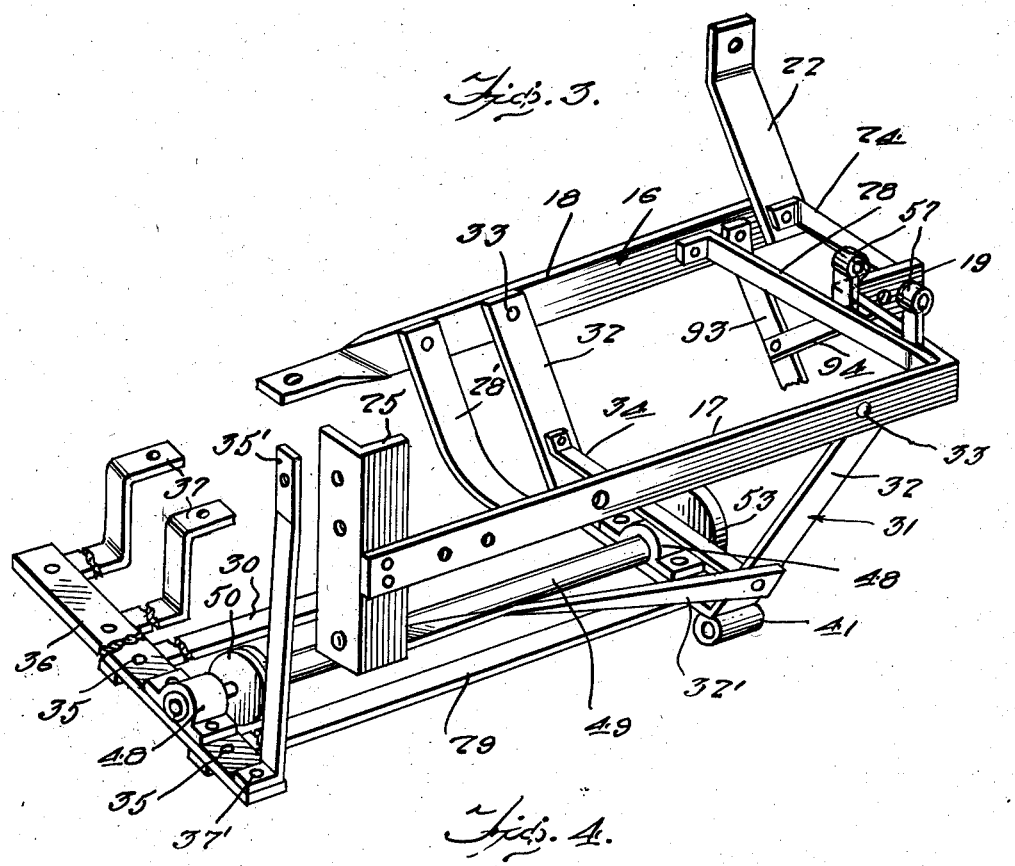
Figure 3 is a view in perspective of the frame.
Figure 4:
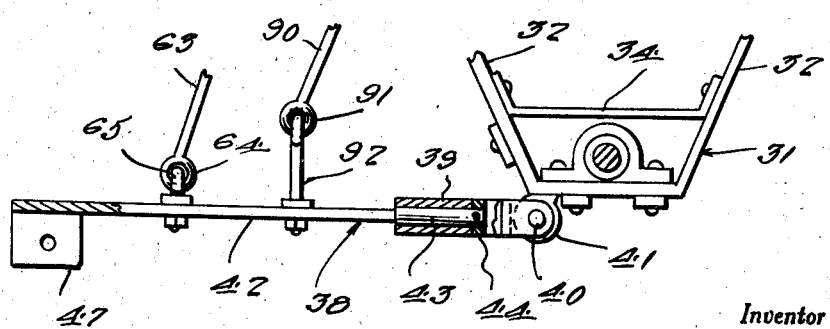
Figure 4 is a fragmentary view in longitudinal section taken on the line 4—4 of Figure 1.

Manual means are provided for operating the push rod 68 to effect rocking of the rock shaft 56 in the described direction so as to manually lift the support 38 and raise the cutter bar 45 out of cutting position. This means comprises a hand-lever 81 upstanding from the bar 25 and suitably pivoted thereto, as at 82, said lever having the usual detent 83 and detent sector 84 associated therewith. A push rod 77 is pivoted at one end, as at 78, to lever 81 to extend alongside push rod 68 with its opposite end slidably mounted in a collar 79 fast on said push rod 68. A set collar 80 fast on push rod 77 for abutting collar 79 under movement of lever 73 and push rod 77 forwardly, as viewed in Figures 1, 2, provide a one-way connection between said lever and push rod 68 whereby the cutter bar 45 may be manually raised out of cutting position as will be clear.

For rotating the arm 42 of support 38 to adjust the depth of the cut, a second hand-lever 75 is suitably pivoted, as at 72, in upstanding position, on the clip 36' with a detent 76 and a detent sector 76' associated therewith. A vertically swingable link 85 extends forwardly from lever 81 and is pivoted, as at 86, to the upper end of a lever 87 pivoted intermediate its ends, as at 88, on the side bar 17 of frame 16. The lower end of lever 87 is swivelled, as at 89, to a link 90 swivelled, as at 91, on an eye-bolt 92 arising from the arm 42 of support 38. As will be obvious, operation of lever 81, will, through link 85, lever 87, link 90 and eye-bolt 92 rotate arm 42 to tilt the cutter bar 45, in its cutting position, and thereby vary the depth of the cutting operation.

The members 93, 94 suspend from the frame 16 a suitably pivoted link 95 forming a brace between the frame 16 and arm 42 of bracket 38 steadying the latter against rearward thrust during the cutting operation.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claim.

What I claim is:

The combination with a tractor including a chassis and a power lift shaft, of a frame underslung from said chassis, a support on one side of said frame pivotally mounted thereon for vertical swinging movement and rotatable about an axis at a right angle to its axis of swinging movement, a mower blade assembly mounted on said support for vertical swinging thereby into and from mowing position and rotation thereby to vary its cutting angle, means to swing said support under operation of said power lift shaft including a rock shaft on said frame, operatively connected to said support, a crank arm on said rock shaft, a push rod extending from said crank arm, a crank on said power lift shaft, a one-way pick-up connection between said crank and push rod providing for independent operation of the rod, and means to independently operate said rod comprising a hand lever, and a one-way pick-up connection between said lever and rod providing for operation of the rod by said first pick-up connection, the operating connection between said crank arm and support comprising a link swivelled at one end on said support and having its other end swiveled on said frame, a lift rod connected to said link, and a crank connection between said rock shaft and lift rod, whereby said support is rotatable independently of said operating connections, and means to independently rotate said support.

PAUL J. POKLUDA.